US012744449B2

(12) United States Patent
Shiomi

(10) Patent No.: US 12,744,449 B2
(45) Date of Patent: Sep. 22, 2026

(54) RECTIFIER CIRCUIT AND POWER SUPPLY UNIT

(71) Applicant: SHARP KABUSHIKI KAISHA, Sakai City (JP)

(72) Inventor: Takeshi Shiomi, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 143 days.

(21) Appl. No.: 18/921,313

(22) Filed: Oct. 21, 2024

(65) Prior Publication Data

US 2025/0141335 A1 May 1, 2025

(30) Foreign Application Priority Data

Oct. 30, 2023 (JP) ................................ 2023-185134

(51) Int. Cl.

*H02M 1/00* (2007.01)
*H02M 7/04* (2006.01)
*H02M 7/219* (2006.01)

(52) U.S. Cl.

CPC ........... *H02M 1/0051* (2021.05); *H02M 7/05* (2021.05); *H02M 7/219* (2013.01)

(58) Field of Classification Search

CPC ....... H02M 1/0051; H02M 7/05; H02M 7/219
See application file for complete search history.

(56) References Cited

U.S. PATENT DOCUMENTS

2020/0266726 A1* 8/2020 Shiomi ................. H02M 7/217
2021/0028711 A1* 1/2021 Shiomi ................. H02M 3/158
2021/0057980 A1* 2/2021 Shiomi ............... H02M 3/1588
2021/0099081 A1* 4/2021 Shiomi .................... H02M 1/34
2021/0104950 A1* 4/2021 Shiomi ............. H02M 3/33523
2021/0288577 A1* 9/2021 Shiomi ................. H02M 3/155
2021/0320584 A1* 10/2021 Shiomi ................. H02M 1/346

FOREIGN PATENT DOCUMENTS

JP 2016-220468 A 12/2016

* cited by examiner

*Primary Examiner* — Rafael O De Leon Domenech
(74) *Attorney, Agent, or Firm* — ScienBiziP, P.C.

(57) ABSTRACT

A rectifier circuit is used that includes a high withstand voltage transistor, a low withstand voltage transistor, and a control transistor. The high withstand voltage transistor has a reference terminal thereof connected to a high voltage terminal of the low withstand voltage transistor, and the high withstand voltage transistor has a control terminal thereof connected to a reference terminal of the low withstand voltage transistor via a capacitor. The control transistor has a high voltage terminal thereof connected to the control terminal of the high withstand voltage transistor, a reference terminal thereof connected to the reference terminal of the low withstand voltage transistor, and a control terminal thereof connected to the high voltage terminal of the low withstand voltage transistor.

4 Claims, 4 Drawing Sheets

RECTIFIER CIRCUIT AND POWER SUPPLY UNIT

CROSS-REFERENCE TO RELATED APPLICATION

The present application claims priority from Japanese Application JP2023-185134, filed on Oct. 30, 2023, the content of which is hereby incorporated by reference into this application.

BACKGROUND

1. Field

The following disclosure relates to rectifier circuits and power supply units.

2. Description of the Related Art

In rectifier circuits, switching loss occurs due to a reverse recovery current. Research work is therefore underway to reduce the reverse recovery current. Japanese Unexamined Patent Application Publication No. 2016-220468 discloses an example of such research.

SUMMARY

This rectifier circuit however still leaves room for improvement.

The present specification discloses a rectifier circuit and a power supply unit that enable reducing loss over conventional technology.

To address the problem, the present disclosure, in one aspect thereof, is directed to a rectifier circuit including a high withstand voltage transistor, a low withstand voltage transistor, and a control transistor.

The high withstand voltage transistor has a reference terminal thereof connected to a high voltage terminal of the low withstand voltage transistor.

The high withstand voltage transistor has a control terminal thereof connected to a reference terminal of the low withstand voltage transistor via a capacitor.

The control transistor has a high voltage terminal thereof connected to the control terminal of the high withstand voltage transistor, a reference terminal thereof connected to the reference terminal of the low withstand voltage transistor, and a control terminal thereof connected to the high voltage terminal of the low withstand voltage transistor.

To address the problem, the present disclosure, in one aspect thereof, is directed to a power supply unit including the rectifier circuit.

The present disclosure enables reducing loss over conventional technology.

DETAILED DESCRIPTION OF THE DISCLOSURE

Embodiment 1

The present specification discloses a rectifier circuit capable of reducing a reverse recovery current. A rectifier circuit RC1 may be shown simply as RC1 as an example of the description of the reference number in drawings. The following abbreviation is used. "MOS" stands for "metal-oxide-semiconductor field-effect transistor."

Main Structure of Rectifier Circuit

Figure 1:
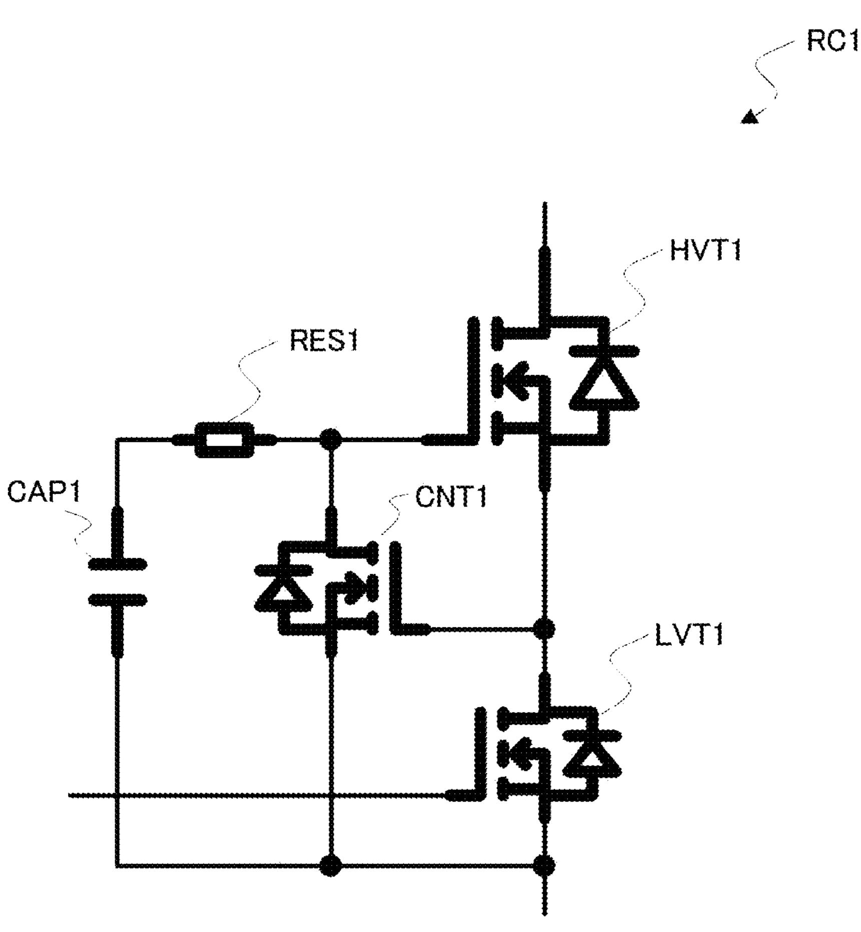
FIG. 1 is a diagram of a structure of a rectifier circuit in accordance with the present disclosure.

FIG. 1 shows a structure of the rectifier circuit RC1 for reducing the reverse recovery current.

RC1 includes a high withstand voltage transistor HVT1, a low withstand voltage transistor LVT1, and a control transistor CNT1. HVT1, LVT1, and CNT1 have a reference terminal, a control terminal, and a high voltage terminal. This control terminal is for applying a voltage or current for controlling the turning-on/off of the transistor. The reference terminal provides a reference for the voltage and/or current applied to the control terminal. The high voltage terminal is capable of receiving high voltage when the transistor is turned off through the control terminal. The high voltage terminal corresponds to, for example, the drain terminal of a MOS.

RC1 includes a capacitor CAP1 and a resistor RES1. CAP1 is fed with a voltage as CAP1 is connected to an auxiliary power supply (not shown).

The reference terminal of HVT1 is connected to the high voltage terminal of LVT1. The control terminal of HVT1 is connected to the reference terminal of LVT1 first via the resistor RES1 and then via the capacitor CAP1. CNT1 has a reference terminal thereof connected to the reference terminal of LVT1, a control terminal thereof connected to the high voltage terminal of LVT1, and a high voltage terminal thereof connected to the control terminal of HVT1.

Detailed Structure of Rectifier Circuit

HVT1 is a N channel MOS the withstand voltage of the high voltage terminal of which is 600 V. LVT1 is a N channel MOS the withstand voltage of the high voltage terminal of which is 30 V. The withstand voltage of HVT1 is specified to be higher than or equal to 10 times the withstand voltage of LVT1. CNT1 is a N channel MOS the withstand voltage of the high voltage terminal of which is 20 V.

The threshold voltage for turning on the transistor is 5 V for HVT1, 3 V for LVT1, and 1 V for CNT1.

The ON resistance of the transistor is 50 mΩ for HVT1, 3 mΩ for LVT1, and 1Ω for CNT1.

RES1 has a resistance of 62Ω, and CAP1 has a voltage of 15 V.

Operation of Rectifier Circuit and Reverse Recovery Current

A rectification current can passed from the reference terminal of LVT1 to the high voltage terminal of HVT1 by applying a forward voltage to RC1. In addition, the rectification current can be stopped by applying a reverse voltage to RC1. At the time when a reverse voltage starts to be applied, RC1 undergoes reverse recovery in which a reverse recovery current is generated that flows in a direction opposite to the rectification current. All currents of RC1 stop after this reverse recovery is finished.

HVT1 and LVT1 are configured to have an overlapping conduction period. HVT1 and LVT1 are configured so that the parasitic diode of LVT1 conducts while the rectification current is flowing and that a current flows toward the channel side as the channel of HVT1 is automatically turned on. The conduction of the channel side of HVT1 restrains the conduction of the parasitic diode, thereby restraining the reverse recovery current of the parasitic diode.

Synchronized rectification is also possible in which LVT1 is also turned on through an external signal while the rectification current is flowing.

HVT1 and LVT1 are configured also to have an overlapping non-conduction period.

The reverse voltage turns off the parasitic diode of LVT1, thereby raising the voltage of the high voltage terminal relative to the reference voltage terminal of LVT1. Accordingly, the voltage of the control terminal relative to the reference voltage terminal of HVT1 decreases to or below the threshold voltage, turning off the channel of HVT1.

As described here, both HVT1 and LVT1 stop conducting.

Operation as Switch Circuit

RC1 can be used as a rectifier circuit as described above. Meanwhile, RC1 can also operate as a switch circuit.

RC1 can also perform a switching operation by applying a voltage to the control terminal of LVT1 to turn on while a voltage is being applied to the high voltage terminal of HVT1 with the reference terminal of LVT1 as a reference. This is because RC1 is configured such that in conjunction with the turning-on of LVT1, HVT1 is also turned on.

Transistor Application Examples

HVT1 may be, besides the SJ-MOS, a high withstand voltage transistor such as the SiC-MOS, the GaN-HEMT, or the JFET.

LVT1 and CNT1 may be, besides the Si-MOS, a low withstand voltage transistor such as the GaN-HEMT or the bipolar transistor.

Over-Discharge Prevention and High Speed Turn-Off of Capacitor

In the present embodiment, RES1 is disposed between CAP1 and the high voltage terminal of CNT1. In addition, the high voltage terminal of CNT1 is connected to the control terminal of HVT1. This is intended to achieve both over-discharge prevention for CAP1 and high speed turn-off of the control terminal of HVT1 when CNT1 is turned on. RES1 may be omitted when over-discharge of CAP1 does not pose a problem.

Overdrive Voltage of High Withstand Voltage Transistor and Threshold Voltage of Control Transistor The threshold voltage of CNT1 is configured by a value lower than a value that remains when the threshold value of HVT1 is subtracted from the voltage of CAP1.

Specifically, it is configured such that the voltage (overdrive voltage) that remains when the HVT1 threshold value of 5 V is subtracted from the voltage 15 V of CAP1 is 10 V. While the voltage between the reference terminal and the high voltage terminal of LVT1 is rising up to 10 V, which is an overdrive voltage in the present example, HVT1 remains turned on because the voltage between the reference terminal and the control terminal of HVT1 is in excess of the threshold value. In the reverse recovery period, there is a need to turn off early because HVT1 passes a reverse current without turning off. When the threshold voltage of CNT1 is lower than 10 V, HVT1 can be turned off first by CNT1. Since the threshold voltage of CNT1 is specified to 1 V, which is lower than 10 V, HVT1 can be turned off early.

The threshold voltage of CNT1 is preferably lower than or equal to half the value that remains when the threshold value of HVT1 is subtracted from the voltage of CAP1. The threshold voltage of CNT1 is preferably higher than or equal to 0.5 V with a view to noise-induced malfunction.

Figure 2:
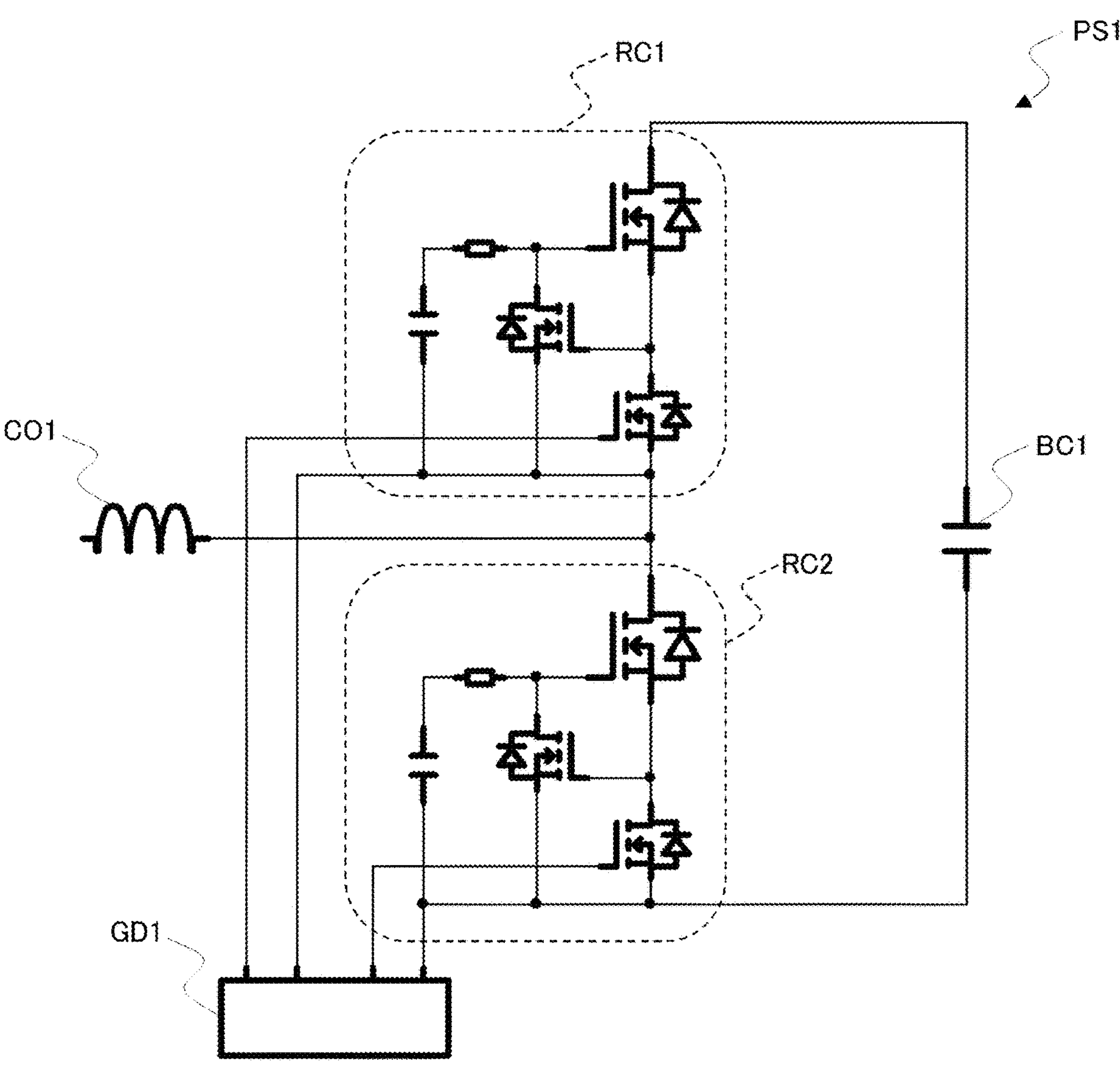
FIG. 2 is a diagram of a power supply circuit in which the rectifier circuit in accordance with the present disclosure is adopted.

Power Supply Circuit Adopting Rectifier Circuit in Accordance with Present Disclosure FIG. 2 shows a step-up power supply circuit PS1 that adopts RC1. PS1 includes RC1, a rectifier circuit RC2, a gate drive circuit GD1, a step-up coil CO1, and a bus capacitor BC1.

The rectifier circuit RC2 has the same configuration as RC1. RC1 is caused to function as a rectifier circuit for passing a rectification current. RC2 is caused to function as a switch circuit for exciting CO1.

PS1 outputs a voltage of 400 V from an input voltage of 200 V (not shown).

The high voltage terminal of HVT1 of RC1 is connected to the positive terminal of 400 V of BC1. The reference terminal of LVT1 of RC1 is connected to a switch node that is an end of CO1.

The high voltage terminal of HVT1 of RC2 is connected to an end of CO1. The reference terminal of LVT1 of RC2 is connected to the negative terminal of 0 V of BC1.

Since RC1 and RC2 are circuits having the same configuration, the functions of rectification operation and switch operation can be swapped. Therefore, PS1 may be caused to operate as a step-down circuit for inputting electric power from 400 V and outputting to 200 V. In addition, PS1 may be used as an inverter circuit for handling AC.

Reverse Recovery Current Reducing Effect of Rectifier Circuit

Figure 3:
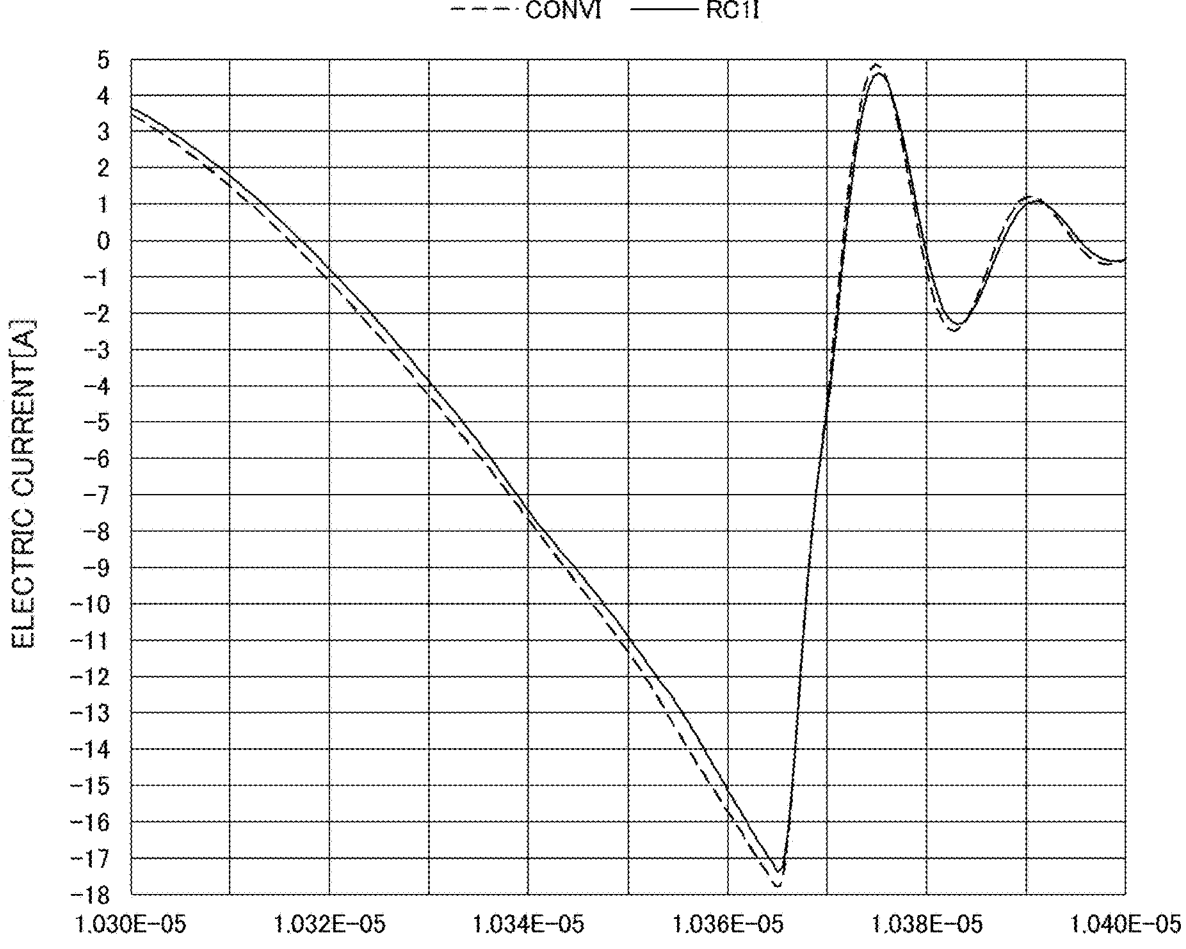
FIG. 3 is a diagram of a reverse recovery current reducing effect of the rectifier circuit in accordance with the present disclosure.

In the present embodiment, FIG. 3 shows a reverse recovery current reducing effect in a case where PS1 is caused to operate as a step-up circuit. FIG. 3 shows a reverse recovery current as a negative current.

Dotted line CONVI represents a reverse recovery current for a circuit in which CNT1 is not included in RC1. Solid line RC1I represents a reverse recovery current for RC1. The maximum negative current is 17.8 A for CONVI and 17.4 A for RC1I. It can be verified that the maximum negative current is smaller by 0.4 A for RC1I.

Embodiment 2

Figure 4:
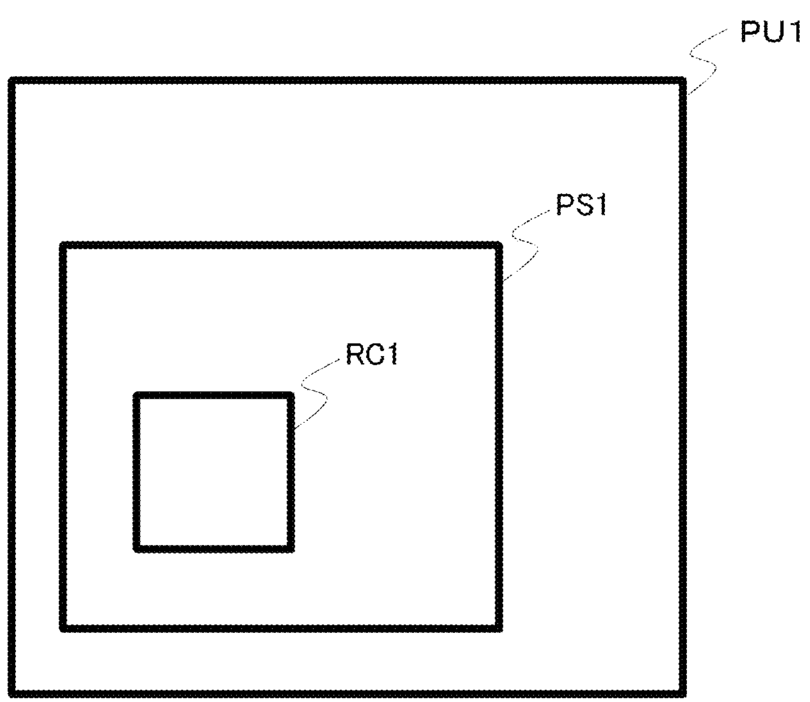
FIG. 4 is a diagram of a power supply unit including the rectifier circuit in accordance with the present disclosure.

An example of a power supply unit PU1 that adopts RC1 is shown with reference to FIG. 4. PU1 includes PS1 including RC1. RC1, which is capable of restraining reverse recovery current, enables configuring loss-reduced PU1.

It should be noted that each numerical value mentioned above is merely illustrative. It is also possible, where appropriate, to, for example, insert a resistor on a wire and/or add a capacitor between wires, in order to adjust circuit behavior.

ADDITIONAL REMARKS

The presently contemplated embodiments of the present disclosure disclosed above may be modified in various ways as needed. The appended claims are intended to incorporate these modifications insofar as they encompass the essence of the present disclosure.

What is claimed is:

1. A rectifier circuit comprising a high withstand voltage transistor, a low withstand voltage transistor, and a control transistor, wherein the high withstand voltage transistor includes a reference terminal connected to a high voltage terminal of the low withstand voltage transistor, the high withstand voltage transistor includes a control terminal connected to a reference terminal of the low withstand voltage transistor via a capacitor, and the control transistor includes:

a high voltage terminal connected to the control terminal of the high withstand voltage transistor;

a reference terminal connected to the reference terminal of the low withstand voltage transistor; and a control terminal connected to the high voltage terminal of the low withstand voltage transistor.

2. The rectifier circuit according to claim 1, wherein a resistor is connected between the capacitor and the high voltage terminal of the control transistor.

3. The rectifier circuit according to claim 1, wherein the control transistor has a threshold voltage lower than a value obtained by subtracting a threshold value of the high withstand voltage transistor from a voltage of the capacitor.

4. A power supply unit comprising the rectifier circuit according to claim 1.

* * * * *